United States Patent
Balamane et al.

(10) Patent No.: US 8,908,482 B1
(45) Date of Patent: Dec. 9, 2014

(54) SACRIFICIAL PROTECTION LAYER FOR PREVENTING ION MILL DAMAGE TO HAMR OPTICAL COMPONENTS

(71) Applicant: HGST Netherlands B.V., Amsterdam (NL)

(72) Inventors: Hamid Balamane, Portola Valley, CA (US); Thomas William Clinton, Danville, CA (US); Jui-Lung Li, San Jose, CA (US); Juraj Topolancik, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/181,508

(22) Filed: Feb. 14, 2014

(51) Int. Cl.
*G11B 11/00* (2006.01)

(52) U.S. Cl.
USPC ........................................ 369/13.33

(58) Field of Classification Search
None
See application file for complete search history.

(56) References Cited

U.S. PATENT DOCUMENTS

| | | | |
|---|---|---|---|
| 6,848,166 B2 | 2/2005 | Lee | |
| 7,290,324 B2 | 11/2007 | Fontana, Jr. et al. | |
| 7,483,229 B2 | 1/2009 | Rausch et al. | |
| 7,765,677 B2 | 8/2010 | Balamane et al. | |
| 8,472,287 B1 | 6/2013 | Isogai et al. | |
| 8,491,801 B1 * | 7/2013 | Tanner et al. | 216/22 |
| 8,491,802 B1 | 7/2013 | Gao et al. | |
| 8,721,902 B1 * | 5/2014 | Wang et al. | 216/22 |
| 2002/0191350 A1 | 12/2002 | Emilio Santini | |
| 2009/0266789 A1 | 10/2009 | Shimazawa et al. | |
| 2013/0258825 A1 | 10/2013 | Seigler et al. | |

FOREIGN PATENT DOCUMENTS

| | | |
|---|---|---|
| EP | 1638094 A2 | 3/2006 |
| JP | 2012160240 A * | 8/2012 |

OTHER PUBLICATIONS

Yoshida, H. et al.; "A Novel Thin-Overcladding Spot-Size Converter for Efficient Silicon-Wire Optical Interconnections and Waveguide Circuits"; IEEE International Conference on Group IV Photonics; Sep. 2008.

Tsuchizawa, T. et al.; "Microphotonics Devices Based on Silicon Microfabrication Technology"; IEEE Journal of Selected Topics in Quantum Electonics 11; Jan. 2005.

Pu, M. et al.; Ultra-Low-Loss Inverted Taper Coupler for Silicon-on-Insulator Ridge Waveguide'; Optic Communications; May 2010; 5 pages.

Shoji, T. et al.; "Low Loss Mode Size Converter from 0.3pm Square Si Wire Waveguides to Singlemode Fibres"; Electronics Letters Online No: 20020762; Jul. 2002; 2 pages.

Kawano K. et al.;"Design of a Spotsize-Converter-Integrated Laser Diode (SS-LD) with a Lateral Taper, Thin-Film Core and Ridge in the 1.3-m-Wavelength Region Based on the 3-D BPM"; IEEE Journal of Selected Topics in Quantum Electonics, vol. 2 No. 2; Jun. 1996, 7 pages.

Ohira, K. et al. "On-Chip Optical Interconnection by Using Integrated III-V Laser Diode and Photodetector with Silicon Waveguide": Optics Express 15440; vol. 18, No. 15; Jul. 2010; 8 pages.

* cited by examiner

*Primary Examiner* — Brenda Bernardi
(74) *Attorney, Agent, or Firm* — Patterson & Sheridan, LLP

(57) ABSTRACT

The embodiments disclosed herein generally relate to a HAMR head in which the SSC is fabricated adjacent the NFT where the SSC is formed on a substrate that has been protected from NFT fabrication processing conditions. As such, the substrate remains smooth so that the SSC formed thereover, is not negatively impacted by the NFT process conditions.

20 Claims, 5 Drawing Sheets

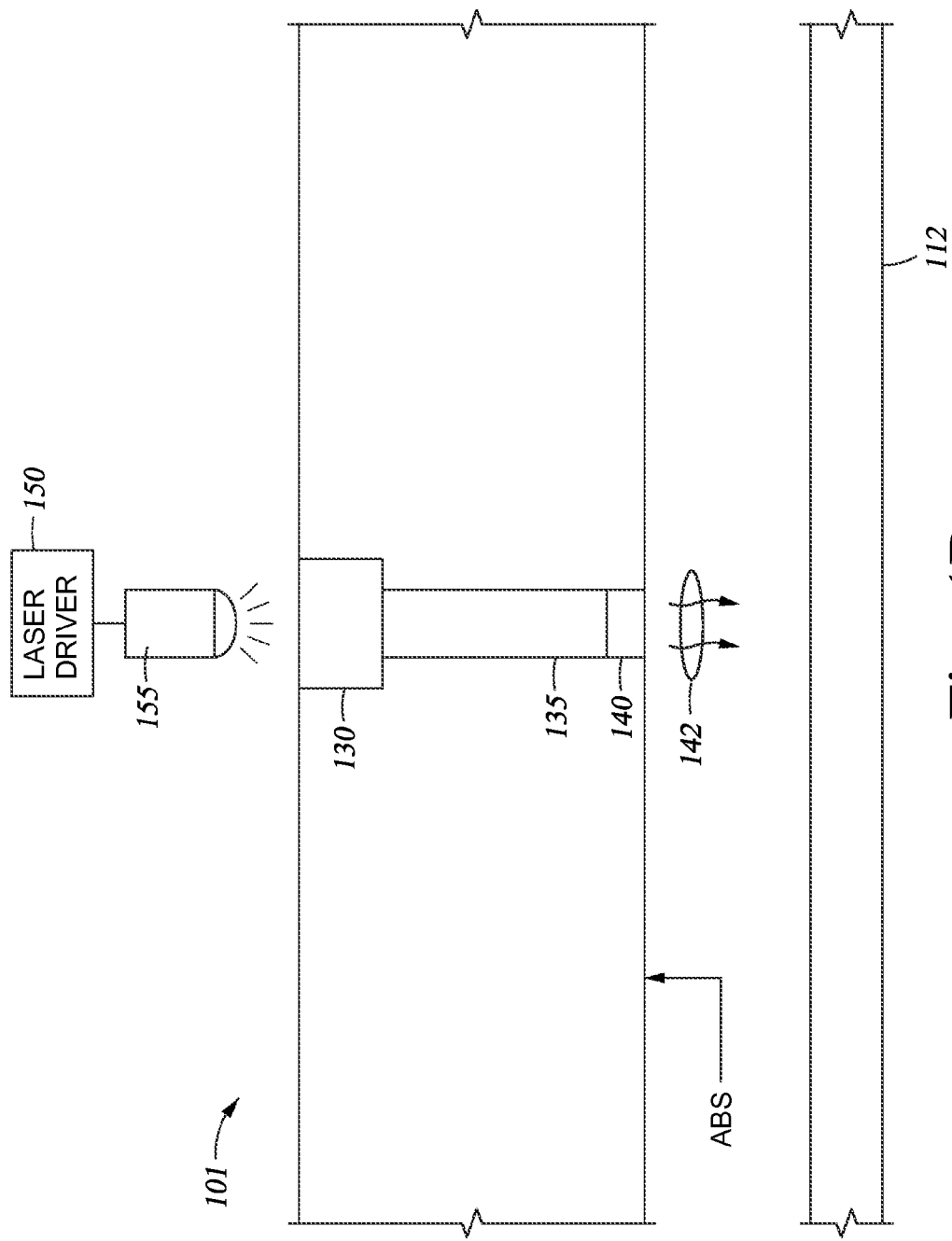

SACRIFICIAL PROTECTION LAYER FOR PREVENTING ION MILL DAMAGE TO HAMR OPTICAL COMPONENTS

BACKGROUND OF THE INVENTION

1. Field of the Invention

Embodiments disclosed herein generally relate to a heat-assisted magnetic recording (HAMR) head.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or HAMR which are used interchangeably herein. It can be applied to longitudinal and perpendicular recording systems as well as "bit patterned media". Heating of the media surface has been accomplished by a number of techniques such as focused laser beams or near-field optical sources.

HAMR contain two optical components: a microphotonic spot-size converter (SSC) and a near-field transducer (NFT). SSCs transform the output of an external light source, such as a semiconductor laser diode (LD) into a well-confined guided mode that delivers light into the NFT. The NFT is a plasmonic nanoantenna that focuses the light further into an ultra-small spotsize, which is far beyond the diffraction limit, needed for high density magnetic recording.

While there are many optical systems capable of performing the transformation, one of the simplest and most efficient realizations involves a taper SSC. Taper SSCs are used to overcome the significant modal mismatch between the free-space beams (or optical fiber modes) and the on-chip photonic components. Tapered SSCs are designed for a particular incident LD input to minimize optical conversion losses. However, the SSC is fabricated after the NFT has been fabricated and hence, the substrate upon which the SSC is formed, is exposed to the processing conditions that are used to fabricate the NFT. Hence, the NFT processing conditions can negatively impact the SSC.

Therefore, there is a need in the art for an improved SSC for HAMR heads.

SUMMARY OF THE INVENTION

The embodiments disclosed herein generally relate to a HAMR head in which the SSC is fabricated adjacent the NFT where the SSC is formed on a substrate that has been protected from NFT fabrication processing conditions. As such, the substrate remains smooth so that the SSC formed thereover, is not negatively impacted by the NFT process conditions.

In one embodiment, a heat assisted magnetic recording device comprises a substrate comprising an insulating material; a near field transducer disposed over a first portion of the substrate; and a spot size converter disposed over a second portion of the substrate different from the first portion, wherein the substrate has a third portion disposed between the first and second portions and wherein the second portion has a surface roughness that is less than a surface roughness of the third portion.

In another embodiment, a heat assisted magnetic recording device comprises a substrate formed of an insulating material; a near field transducer disposed over a first portion of the substrate; and a spot size converter disposed over a second portion of the substrate different from the first portion, wherein the substrate has a third portion disposed between the first and second portions and wherein the second portion has a first surface roughness that is different than the surface roughness of the third portion.

In another embodiment, a heat assisted magnetic recording device comprises a substrate; and a SSC formed over a first portion of the substrate, wherein a second portion of the substrate is disposed adjacent the first portion and wherein the second portion has a surface roughness that is different than a surface roughness of the first portion.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A and 1B illustrate a disk drive system, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The embodiments discussed herein generally relate to a HAMR head in which the SSC is fabricated adjacent the NFT where the SSC is formed on a substrate that has been protected from NFT fabrication processing conditions. As such, the substrate remains smooth so that the SSC formed thereover, is not negatively impacted by the NFT process conditions.

Figure 1A:
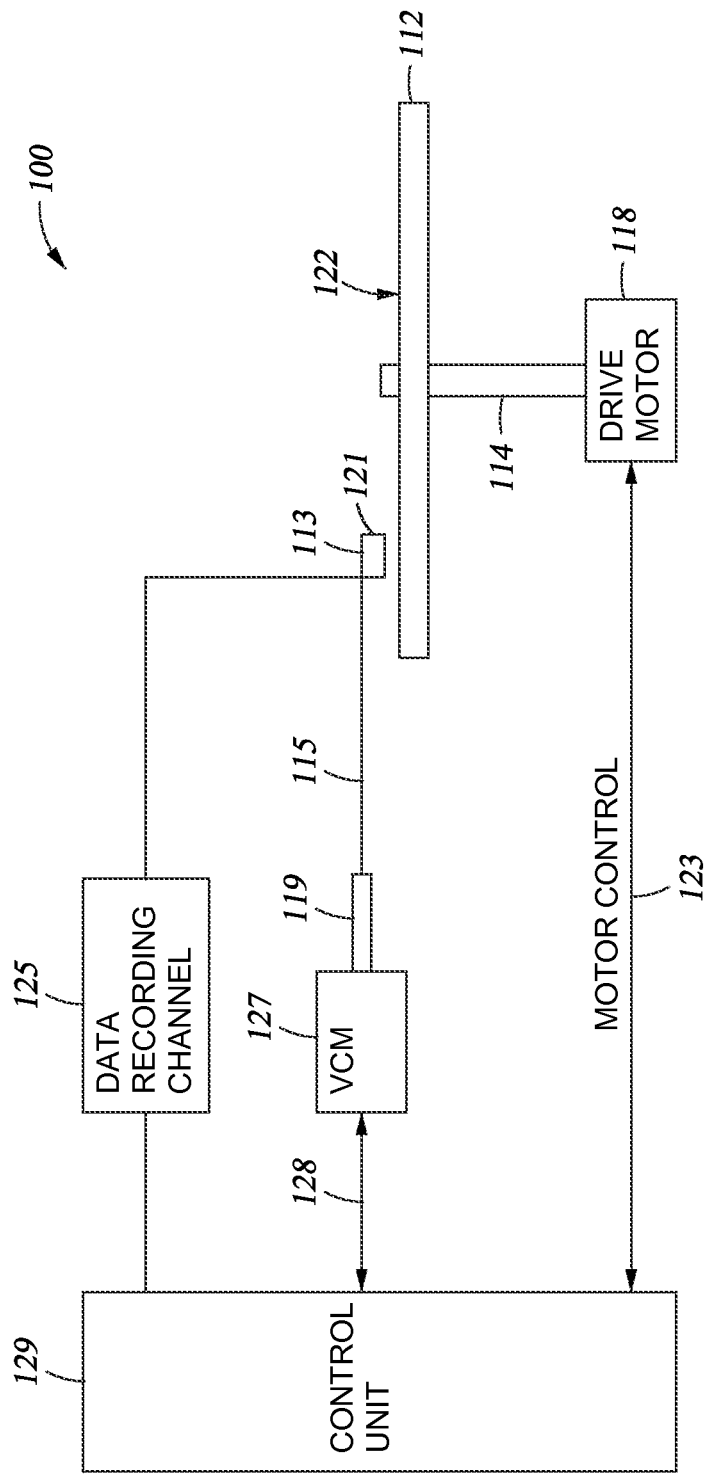

FIG. 1A illustrates a disk drive 100 embodying the invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

FIG. 1B is a cross sectional schematic of a HAMR enabled write head 101, according to one embodiment described herein. The head 101 is operatively attached to a laser 155 (i.e., a radiation source) that is powered by a laser driver 150.

The laser 155 may be placed directly on the head 101 or radiation may be delivered from a laser 155 located separate from the slider through an optical fiber or waveguide. Similarly, the laser driver 150 circuitry may be located on the slider 113 or on a system-on-chip (SOC) associated with the disk drive 100 such as the control unit 129 as shown in FIG. 1A. The head 101 includes a SSC 130 for focusing the radiation transmitted by the laser 155 into the waveguide 135. In some embodiments, the waveguide 135 is part of the SSC 130, meaning the SSC 130 also functions as a waveguide. In another embodiment, the head 101 may include one or more lens for focusing the beamspot of the laser 155 before the emitted radiation reaches the SSC 130. The waveguide 135 is a channel that transmits the radiation through the height of the head 101 to the optical transducer 140—e.g., a plasmonic device—which is located at or near the media facing surface (MFS, such as an air-bearing surface (ABS). The optical transducer 140 (i.e., NFT) further focuses the beamspot to avoid heating neighboring tracks of data on the disk 112—i.e., creates a beamspot much smaller than the diffraction limit. As shown by arrows 142, this optical energy emits from the optical transducer 140 to the surface of the disk 112 below the MFS of the head 101. The embodiments herein, however, are not limited to any particular type of radiation source or technique for transferring the energy emitted from the radiation source to the MFS.

The SSC and the NFT are formed over a common substrate. During fabrication, the NFT is fabricated first and then, the SSC is fabricated. For the NFT, one or more milling steps are performed. The milling can damage the substrate, (i.e., the cladding in this instance) because the substrate will have a surface roughness that cannot be predicted. As such, the SSC, when fabricated over the damaged cladding, may have non-uniform properties. Due to the difference in cladding properties, the SSC will not operate efficiently.

To prevent damage to the substrate during NFT fabrication, the substrate is protected. FIGS. 2A-2F illustrate a HAMR head at various stages of manufacture where the location on the substrate for the SSC is protected during NFT fabrication. The SSC and NFT described below with regards to FIGS. 2A-2H are examples of the SSC 130 and NFT 140 described above with regards to FIG. 1B.

Figure 2A:
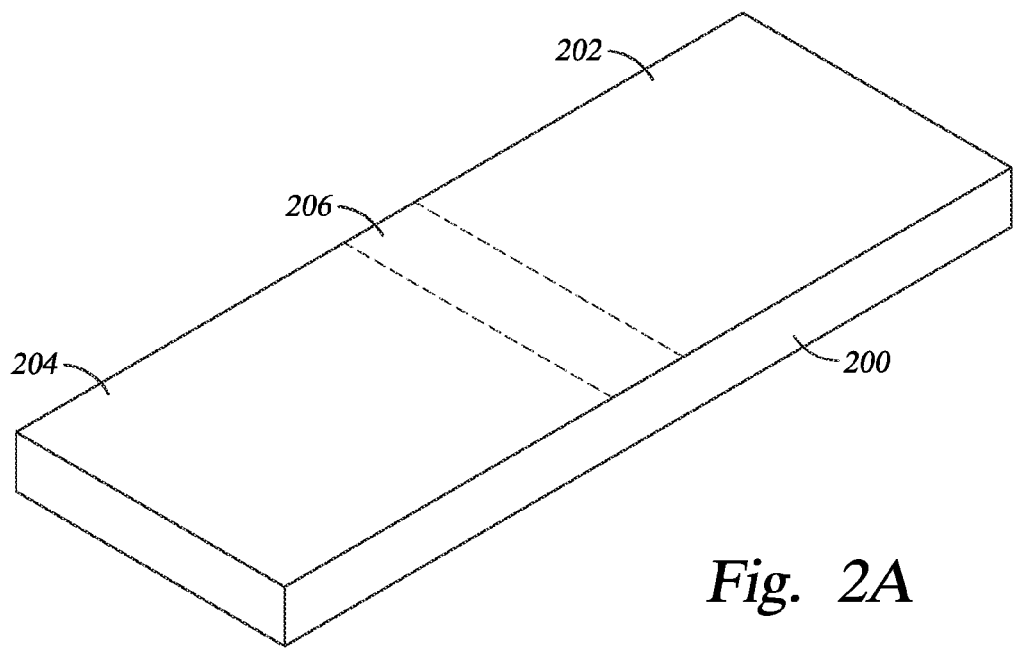
FIGS. 2A-2F are schematic illustrations of a HAMR head at various stages of manufacturing according to one embodiment.

FIG. 2A is an isometric illustration of a substrate 200 prior to fabrication of the NFT or SSC. The substrate 200 comprises an insulating material. In one embodiment, the substrate 200 comprises alumina. The substrate 200 has an initial surface roughness prior to fabrication of the SSC or NFT. In fact, in order to ensure the SSC has uniform properties, the substrate 200 may be planarized prior to formation of the NFT. The substrate 200 may be planarized by a chemical mechanical polishing (CMP) process. The substrate 200 has three portions. A first portion 202 is the location above which the NFT will be fabricated. The second portion 204 is the location above which the SSC will be fabricated. The third portion 206 is the location between the first portion 202 and the second portion 204. The third portion 206 has a significantly smaller surface area than either the first portion 202 or the second portion 204.

Figure 2B:
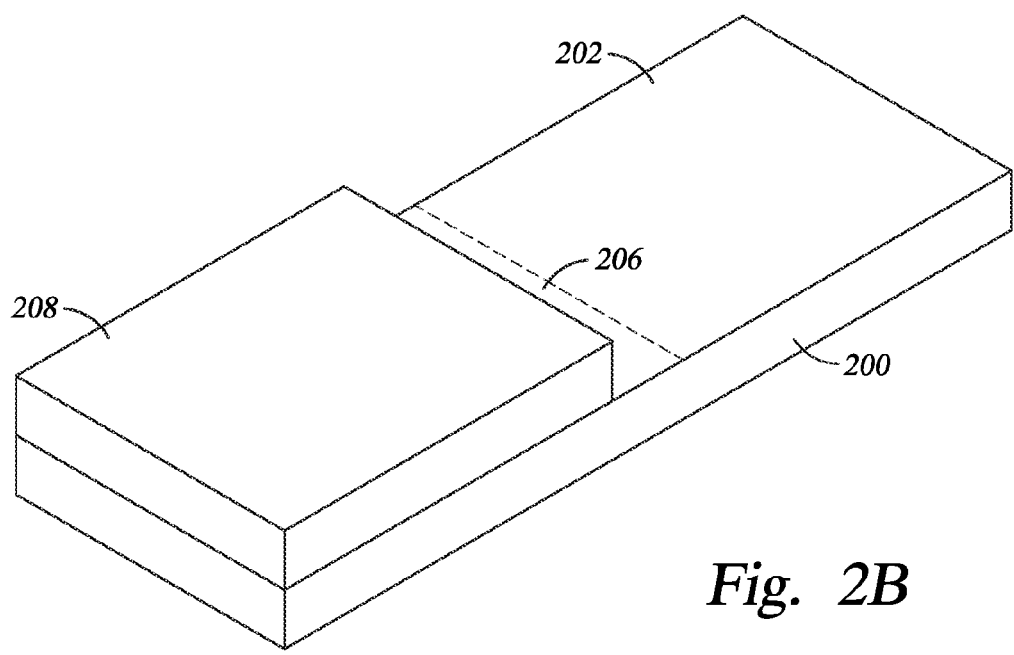

As shown in FIG. 2B, a sacrificial or protection layer 208 is deposited over the second portion 204 of the substrate 200. The sacrificial or protection layer 208 will function to protect the second portion 204 of the substrate 200 during fabrication of the NFT over the first portion 202. The third portion 206, however, is not covered by the sacrificial or protection layer 208 and hence, the third portion 206 is exposed to the process conditions that occur during the fabrication of the NFT over the first portion 202. Suitable materials that may be used for the sacrificial or protection layer 208 include materials that are resistant to milling that occurs during NFT fabrication such as diamond like carbon (DLC) or amorphous carbon.

Figure 2C:
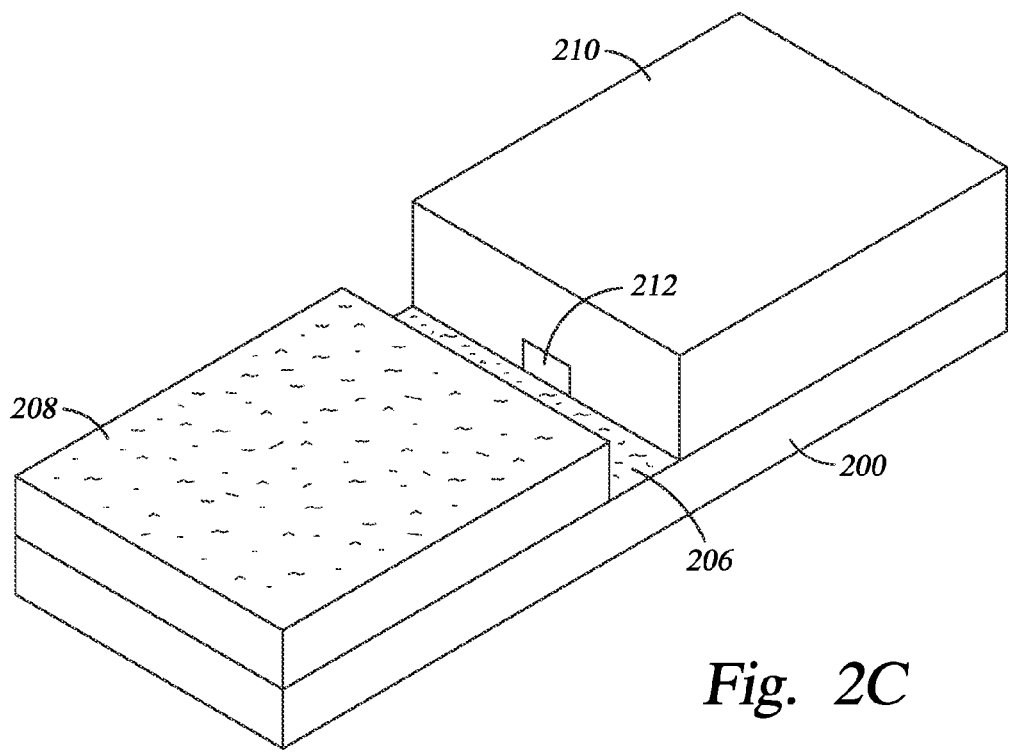
Figure 2D:
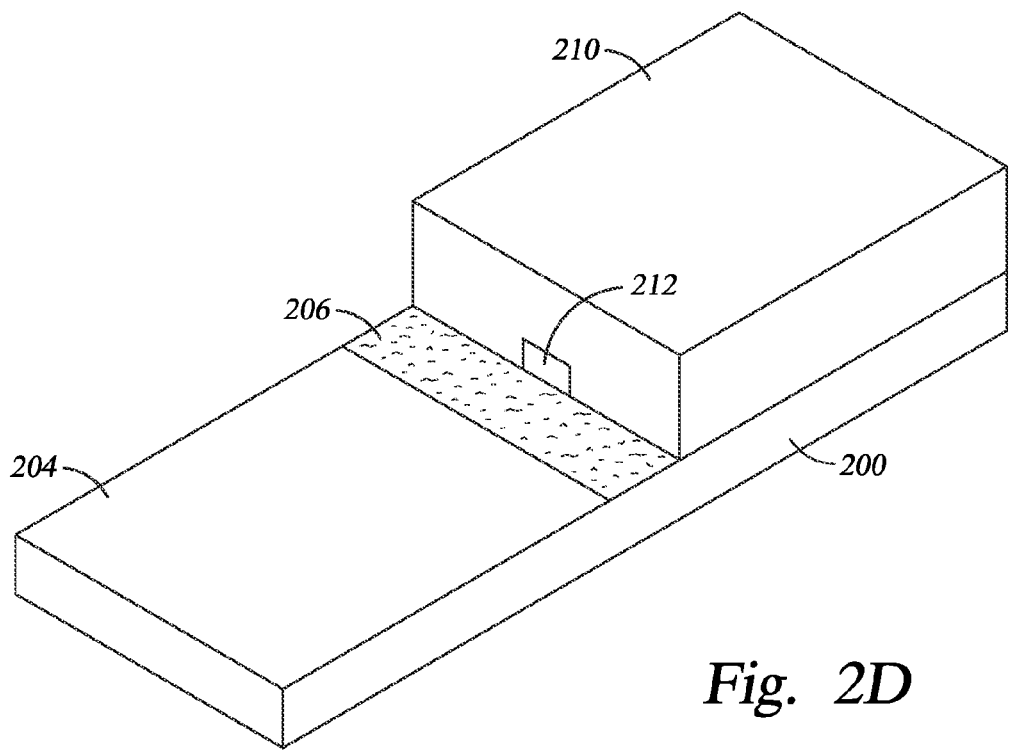

As shown in FIG. 2C, an NFT 210 having an antenna 212 is disposed over the first portion 202 of the substrate 200. During the NFT fabrication, milling occurred and, as such, the third portion 206, as well as the sacrificial or protection layer 208, is damaged. It is to be understood that the milling may occur on layers formed over the sacrificial or protection layer 208. The purpose of the sacrificial or protection layer 208 is to protect the second portion 204 of the substrate 200. Any damage to the sacrificial or protection layer 208 is irrelevant so long as the second portion 204 (i.e., the bottom cladding) is not damaged. The sacrificial or protection layer 208 is then removed to expose the second portion 204 of the substrate 200 as shown in FIG. 2D. The sacrificial or protection layer 208 may be removed by a process such as exposure to a $CO_2$ or $O_2$ plasma or an ashing process. In one embodiment, the sacrificial or protection layer 208 may be removed from a highly-selective RIE process that exposes the original, optically-smooth substrate 200 surface. The second portion 204 has not been damaged during the NFT 210 fabrication and, as such, as the same surface roughness for the second portion 204 is present as after the CMP process. The third portion 206, on the other hand, is significantly rougher than after the CMP process. In fact, the third portion 206 has a different surface roughness, more specifically, a greater surface roughness, as compared to the second portion 204.

Figure 2E:
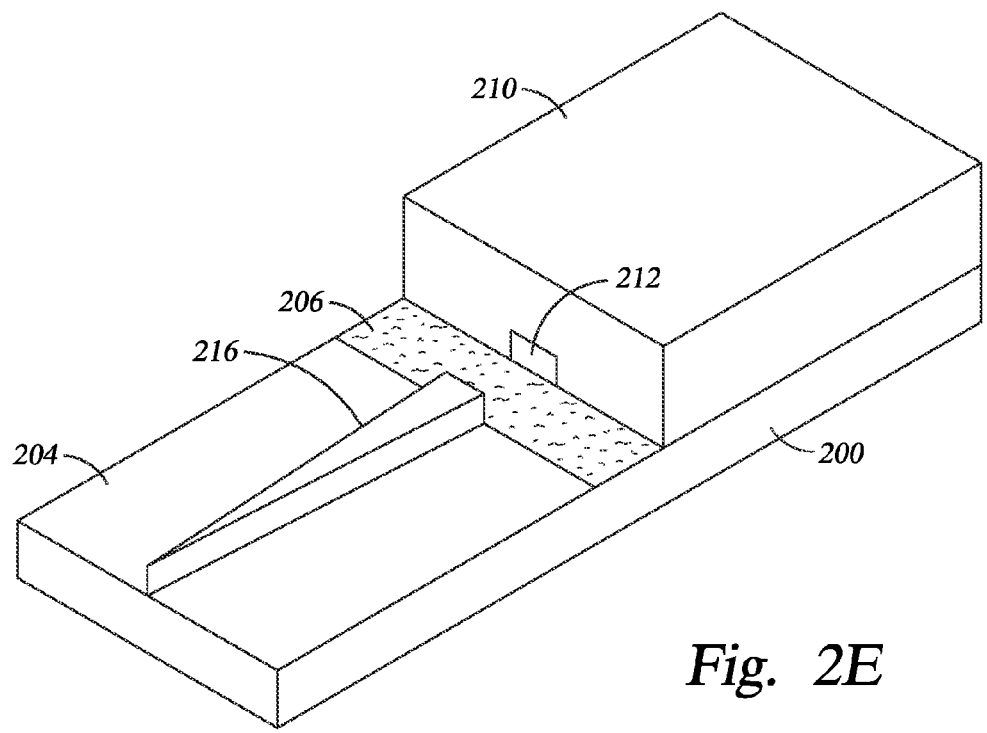
Figure 2F:
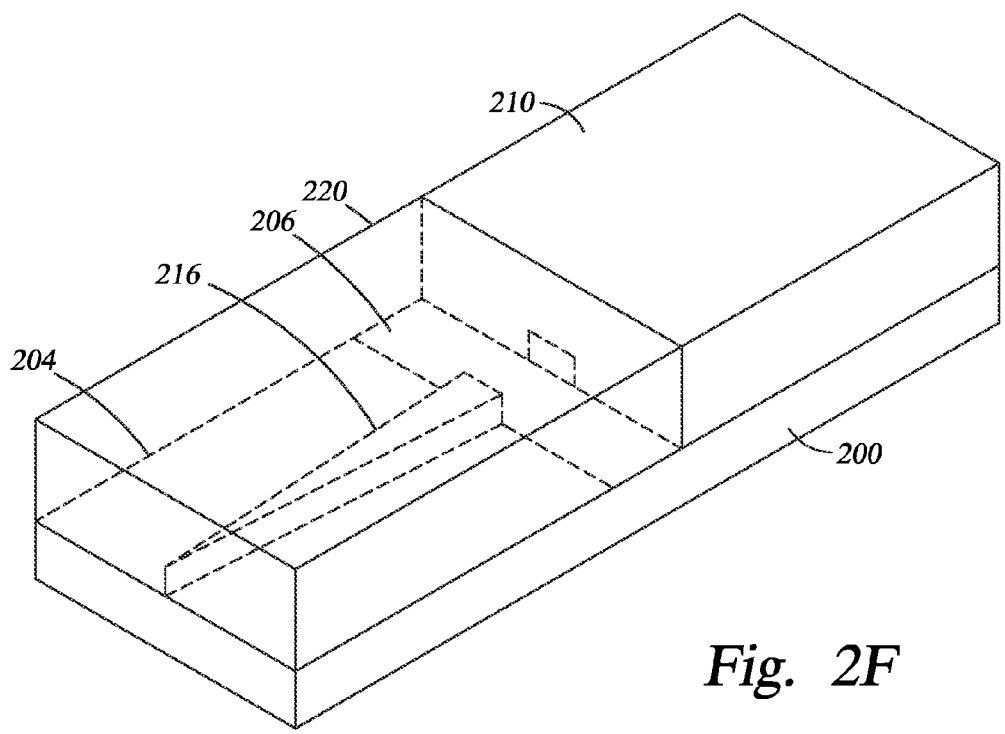

Once the sacrificial or protection layer 208 has been removed the cladding 204 is exposed. The cladding material 204 may comprise a silicon oxide, silicon nitride or silicon oxynitride. The core 216 of the SSC is then formed over the cladding material 204 as shown in FIG. 2E. The core 216 may be formed by depositing material, performing a lithographic process and then etching to remove the undesired material such that the remaining core has a tapered shape with the wide end disposed adjacent the NFT 210 and the narrow end opposite the wide end. Finally, top cladding 220 is deposited over the exposed substrate 200 and core 216 as shown in FIG. 2F. The cladding material 204, 220 and the core 216 collectively form the SSC.

As a result of the sacrificial or protection layer 208, the first portion 204 of the substrate 200 has a different surface roughness as compared to the third portion 206. In absence of the sacrificial or protection layer 208 during processing, the second portion 204 would be damaged just as the third portion 206 is damaged.

The first portion is spaced from the second portion by a distance of less than 1 um, which equals the width of the third portion 206. As such, the second portion 204 has a greater surface area than the third portion 206. The core of the HAMR head is surrounded by cladding, and the cladding comprises aluminum oxide. The SSC may be disposed over the third portion 206 in addition to the second portion 204.

CMP or a polishing process to smooth the second portion 204 is not possible due to the presence of the NFT 210. Because the NFT 210 is present, any CMP would result in damage to the NFT 210 and the polishing pad of a CMP system would not be able to reach the entire second portion 204 because the NFT 210 extends above the substrate 200 and would thus prevent the pad from reaching the entire second portion 204.

Wet etching the second portion 204 or ion milling the NFT 210 at an angle will not be sufficient to maintain a substantially smooth second portion 204. Additionally, reflowing the substrate 200 is not feasible as the temperature necessary to reflow the substrate 200 to a substantially smooth surface would damage the NFT 210. The second portion 204 needs to be as smooth as possible. Any surface roughness will affect the light scattering as the light passes through the SSC. For example, a surface that has theoretically a surface roughness of 0 (i.e., perfectly smooth surface), will have light scattering and reflectance solely based upon the material properties of the substrate. On the other hand, if the surface has a surface roughness, not only will the material properties determine the scattering and reflectance, but the surface roughness will affect the direction where the light is reflected or scattered. The cladding material 218 that is deposited on the core 216 will have a substantially smooth surface opposite the core 216.

Ideally, the surface opposite the core 216 will have a surface roughness equal to the surface roughness of the surface of the cladding material 214 in contact with the second portion 204. It is to be understood that the surface of the cladding material 214 in contact with the second portion 204 will have substantially the same surface roughness as the surface of the second portion 204. As such, it is desirable for the second portion 204 to maintain as smooth a surface as possible. The surface of the second portion 204 is at the lowest surface roughness after the CMP process to polish the surface. Thus, the sacrificial or protection layer 208 functions to protect the second portion 204 so that the surface roughness of the second portion 204, following removal of the sacrificial or protection layer 208, is substantially identical to the surface roughness following CMP. The sacrificial or protection layer 208 should be removed by a process that has little to no interaction with the surface of the second portion 204. In other words, the surface of the second portion 204 should be substantially inert to any process performed to remove the sacrificial or protective layer.

By placing a sacrificial or protection layer over a portion of the substrate where an SSC will be formed, the substrate can be protected from ion milling that occurs during NFT fabrication. As such, the SSC, and in particular the cladding above and below the core of the SSC, can be substantially identical and the HAMR head has a consistent, uniform light delivery to the NFT.

While the foregoing is directed to exemplified embodiments, other and further embodiments of the invention may be devised without departing from the basic scope thereof, and the scope thereof is determined by the claims that follow.

What is claimed is:

1. A heat assisted magnetic recording device, comprising:
    a substrate comprising an insulating material;
    a near field transducer disposed over a first portion of the substrate; and
    a spot size converter disposed over a second portion of the substrate different from the first portion, wherein the substrate has a third portion disposed between the first and second portions and wherein the second portion has a surface roughness that is less than a surface roughness of the third portion.

2. The heat assisted magnetic recording device of claim 1, wherein the first portion is spaced from the second portion by a distance of about 1 micron.

3. The heat assisted magnetic recording device of claim 1, wherein the second portion has a greater surface area than the third portion.

4. The heat assisted magnetic recording device of claim 1, wherein the spot size converter comprises a core surrounded by cladding.

5. The heat assisted magnetic recording device of claim 4, wherein the cladding comprises tantalum oxide.

6. The heat assisted magnetic recording device of claim 5, wherein the cladding is disposed over the third portion.

7. A heat assisted magnetic recording device, comprising:
a substrate formed of an insulating material;
a near field transducer disposed over a first portion of the substrate; and
a spot size converter disposed over a second portion of the substrate different from the first portion, wherein the substrate has a third portion disposed between the first and second portions and wherein the second portion has a first surface roughness that is different than the surface roughness of the third portion.

8. The heat assisted magnetic recording device of claim 7, wherein the insulating material comprises alumina.

9. The heat assisted magnetic recording device of claim 7, wherein the second portion has a greater surface area than the third portion.

10. The heat assisted magnetic recording device of claim 7, wherein the spot size converter comprises a core surrounded by cladding.

11. The heat assisted magnetic recording device of claim 10, wherein the cladding comprises tantalum oxide.

12. The heat assisted magnetic recording device of claim 11, wherein the cladding is disposed over the third portion.

13. The heat assisted magnetic recording device of claim 7, wherein the first portion is spaced from the second portion by a distance of between about 1 nm and about 5 nm.

14. A heat assisted magnetic recording device, comprising:
a substrate; and
a spot size converter formed over a first portion of the substrate, wherein a second portion of the substrate is disposed adjacent the first portion and wherein the second portion has a surface roughness that is different than a surface roughness of the first portion.

15. The heat assisted magnetic recording device of claim 14, wherein the surface roughness of the first portion is less than the surface roughness of the second portion.

16. The heat assisted magnetic recording device of claim 14, wherein the first portion has a greater surface area than the second portion.

17. The heat assisted magnetic recording device of claim 14, wherein the spot size converter comprises a core surrounded by cladding.

18. The heat assisted magnetic recording device of claim 17, wherein the cladding comprises tantalum oxide.

19. The heat assisted magnetic recording device of claim 18, wherein the cladding is disposed over the third portion.

20. The heat assisted magnetic recording device of claim 14, wherein the substrate comprises alumina.

\* \* \* \* \*